(12) United States Patent
Tabor (10) Patent No.: US 8,553,072 B2
(45) Date of Patent: Oct. 8, 2013

(54) BLANKING INTER-FRAME TRANSITIONS OF A 3D SIGNAL

(75) Inventor: Timothy A. Tabor, West Jordan, UT (US)

(73) Assignee: Circa3d, LLC, Salt Lake City, UT (US)

( * ) Notice: Subject to any disclaimer, the term of this patent is extended or adjusted under 35 U.S.C. 154(b) by 0 days.

(21) Appl. No.: 13/377,132

(22) PCT Filed: Feb. 17, 2011

(86) PCT No.: PCT/US2011/025262
§ 371 (c)(1),
(2), (4) Date: Dec. 8, 2011

(87) PCT Pub. No.: WO2012/071063
PCT Pub. Date: May 31, 2012

(65) Prior Publication Data
US 2012/0140031 A1    Jun. 7, 2012

Related U.S. Application Data (63) Continuation-in-part of application No. PCT/US2011/027175, filed on Mar. 4, 2011, and a continuation-in-part of application No. PCT/US2011/027933, filed on Mar. 10, 2011, and a continuation-in-part of application No. PCT/US2011/027981, filed on Mar. 10, 2011, and a continuation-in-part of application No. PCT/US2011/032549, filed on Apr. 14, 2011, and a continuation-in-part of application No. PCT/US2011/031115, filed on Apr. 4, 2011.

(60) Provisional application No. 61/416,708, filed on Nov. 23, 2010.

(51) Int. Cl.
*H04N 13/00* (2006.01)

(52) U.S. Cl.
USPC .......................................................... 348/43

(58) Field of Classification Search
None
See application file for complete search history.

(56) References Cited

U.S. PATENT DOCUMENTS

| 5,572,250 A | 11/1996 | Lipton et al. |
| 5,610,661 A | 3/1997 | Bhatt |

(Continued)

FOREIGN PATENT DOCUMENTS

| CN | 101001320 | 7/2007 |
| CN | 101765024 | 6/2010 |

(Continued)

OTHER PUBLICATIONS

KIPO, Search Report and Written Opinion of PCT/US2011/025262, date of mailing Nov. 23, 2011, 9 pages.

(Continued)

*Primary Examiner* — Thai Tran
*Assistant Examiner* — Sunghyoun Park
(74) *Attorney, Agent, or Firm* — Workman Nydegger (57) ABSTRACT

Inter-frame blanking involves blanking the transition period between two video frames of a three-dimensional video signal. One implementation includes receiving a three-dimensional video signal and determining a frame overlap interval. The frame overlap interval is the time period in which a display device will concurrently display at least one portion of a first video frame and at least one portion of a second video frame during a transition period. The implementation also includes, based on the frame overlap interval, generating an inter-frame blanking signal that instructs a blanking device to filter the display of the three-dimensional video signal.

40 Claims, 6 Drawing Sheets

(56) References Cited

U.S. PATENT DOCUMENTS

| | | | |
|---|---|---|---|
| 6,088,052 | A | 7/2000 | Guralnick |
| 6,603,475 | B1 | 8/2003 | Han et al. |
| 7,511,714 | B1 | 3/2009 | Amann et al. |
| 2002/0070932 | A1 | 6/2002 | Kim |
| 2004/0218269 | A1 | 11/2004 | Divelbiss et al. |
| 2008/0151112 | A1* | 6/2008 | Basile et al. .................. 348/500 |
| 2010/0033555 | A1 | 2/2010 | Nagase et al. |
| 2010/0182402 | A1 | 7/2010 | Nakajima et al. |
| 2010/0207939 | A1* | 8/2010 | Chen et al. ................... 345/419 |
| 2011/0007140 | A1 | 1/2011 | Nakahata et al. |
| 2011/0084974 | A1* | 4/2011 | Jung et al. .................... 345/522 |
| 2011/0102422 | A1 | 5/2011 | Park et al. |
| 2011/0122238 | A1* | 5/2011 | Hulvey et al. ................. 348/56 |

FOREIGN PATENT DOCUMENTS

| | | |
|---|---|---|
| JP | 6350978 | 12/1994 |
| JP | 08-079799 | 3/1996 |
| JP | 9139957 | 5/1997 |
| JP | 11-007275 A | 1/1999 |
| JP | 11069384 | 3/1999 |
| JP | 11-098538 | 4/1999 |
| JP | 2004504736 A | 2/2004 |
| JP | 2007200116 | 8/2007 |
| JP | 2010139855 A | 6/2010 |
| KR | 10-2011-0047936 A | 5/2011 |
| WO | 2007126904 A2 | 11/2007 |

OTHER PUBLICATIONS

KIPO, Search Report and Written Opinion of PCT/US2011/027175, date of mailing Nov. 24, 2011, 9 pages.

KIPO, Search Report and Written Opinion of PCT/US2011/027933, date of mailing Nov. 24, 2011, 9 pages.

KIPO, Search Report and Written Opinion of PCT/US2011/027981, date of mailing Nov. 25, 2011, 9 pages.

KIPO, Search Report and Written Opinion of PCT/US2011/032549, date of mailing Nov. 25, 2011, 9 pages.

KIPO, Search Report and Written Opinion of PCT/US2011/031115, date of mailing Nov. 25, 2011, 9 pages.

Smolic, et al., An overview of available and emerging 3D video formats and depth enhanced stereo as efficient generic solution, Picture Coding Symposium, May 6, 2009, 4 pages.

Eyes3Shut, Odyssey Glasses, http://www.eyes3shut.com/products/odyssey, avaiable at least as early as Dec. 13, 2010.

* cited by examiner

BLANKING INTER-FRAME TRANSITIONS OF A 3D SIGNAL

CROSS-REFERENCE TO RELATED APPLICATIONS

The present invention is a U.S. National Stage Application corresponding to PCT Patent Application No. PCT/US2011/025262, filed Feb. 17, 2009, which claims the benefit of priority to U.S. Provisional Application No. 61/416,708, filed Nov. 23, 2010, entitled "3D VIDEO CONVERTER," the entire contents of the above identified patent applications are incorporated by reference herein.

BACKGROUND OF THE INVENTION

1. The Field of the Invention

This invention relates to systems, methods, and computer program products related to presentation of three-dimensional video content.

2. Background and Relevant Art

Three-dimensional (3D) display technology involves presenting two-dimensional images in a manner that the images appear to the human brain to be three-dimensional. The process typically involves presenting "left" image data to the left eye, and "right" image data to the right eye. When received, the brain perceives this data as a 3D image. 3D display technology generally incorporates the use of a filtering device, such as glasses, which filters displayed image data to the correct eye. Filtering devices can be passive, meaning that image data is filtered passively (e.g., by color code or by polarization), or active, meaning that the image data is filtered actively (e.g., by shuttering).

Traditional display devices, such as computer monitors, television sets, and portable display devices, typically are either incapable of producing suitable image data for 3D viewing, or produce an inferior 3D viewing experience. For instance, viewing 3D content from traditional display devices, generally results in blurry images and/or images that have "ghosting" effects, both of which may cause headache, discomfort, and even nausea in the viewer. This is true even for display devices that incorporate more recent technologies, such as Liquid Crystal Display (LCD), Plasma, Light Emitting Diode (LED), Organic Light Emitting Diode (OLED), etc.

Recently, 3D display devices designed specifically for displaying 3D content have become increasingly popular. These 3D display devices are generally used in connection with active filtering devices (e.g., shuttering glasses) to produce 3D image quality not previously available from traditional display devices. These 3D display devices, however, are relatively expensive when compared to traditional display devices.

As a result, consumers who desire to view 3D content are faced with the purchase of expensive 3D display devices, even when they may already have traditional display devices available. Accordingly, there a number of considerations to be made regarding the display of 3D content.

BRIEF SUMMARY OF THE INVENTION

Implementations of the present invention solve one or more problems in the art with systems, methods, and computer program products configured to enable users to view 3D content on a broad range of display devices. When viewing 3D content using one or more implementations of the present invention, the viewer can experience a level of quality that can match or even exceed the quality of specialized 3D display devices. Accordingly, implementations of the present invention can alleviate or eliminate the need to purchase a 3D-specific display device by allowing a viewer to view 3D content on traditional display devices.

For example, one implementation can include a method of blanking an inter-frame overlap of a three-dimensional video signal. The method can involve receiving a three-dimensional video signal comprising at least a first video frame and a second video frame. The method can also involve determining a frame overlap interval in which at least a portion of the first video frame and at least a portion of the second video frame are to be displayed concurrently at a display device during a transition between the first video frame and the second video frame. Additionally, the method can involve generating an inter-frame blanking signal based on the determined frame overlap interval. The inter-frame blanking signal can comprise one or more instructions for instructing a blanking device to blank a display of the three-dimensional video signal during the transition.

In addition, a method of generating an inter-frame blanking signal can involve generating a first blanking instruction that directs a blanking device to blank a first portion of a view of a display device during at least a portion of a display of a first video frame. The method can also involve identifying a frame overlap time period in which at least a portion of the first video frame and at least a portion of a second video frame are to be displayed concurrently at the display device. Additionally, the method can involve generating a second blanking instruction corresponding to the frame overlap time period that directs the blanking device to simultaneously blank the first portion and a second portion of the view of the display device during at least a portion of the frame overlap time period. Furthermore, the method can involve generating a third blanking instruction which directs the blanking device to blank the second portion of the view of the display device during at least a portion of a display of the second video frame.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention extend to systems, methods, and computer program products configured to enable users to view 3D content on a broad range of display devices. When viewing 3D content using one or more implementations of the present invention, the viewer can experience a level of quality that can match or even exceed the quality of specialized 3D display devices. Accordingly, implementations of the present invention can alleviate or eliminate the need to purchase a 3D-specific display device by allowing a viewer to view 3D content on traditional display devices.

Specialized 3D display devices attempt to provide an enhanced 3D viewing experience by modifying physical characteristics of the display device. For example, specialized 3D display device may include modification that increase frame rate and reduce the frame overlap interval of the display device. The frame rate refers to the number of unique video frames the display device can render in a given amount of time (e.g., one second). Frame overlap interval refers to the period of time that elapses when transitioning between two frames. During the frame overlap interval, the display device displays at least a portion of two or more video frames concurrently. Longer frame overlap intervals are perceptible to the human eye, and can lead to a degraded viewing experience. For example, longer frame overlap intervals can cause motion blurring or ghosting. These effects are a particular problem when viewing 3D video content.

One or more implementations of the present invention provide for the blanking of some or all of the frame overlap interval from the user's view. This involves processing a 3D video signal, determining frame overlap interval information, and generating an inter-frame blanking signal. The inter-frame blanking signal can instruct a blanking device (e.g., shuttering glasses) to synchronously blank portions of the user's view while the user is viewing displayed 3D content. Thus, one or more implementations allow for viewing of 3D content on a broad range of display devices, including devices that that may have lower frame rates and longer frame overlap intervals.

Figure 1:
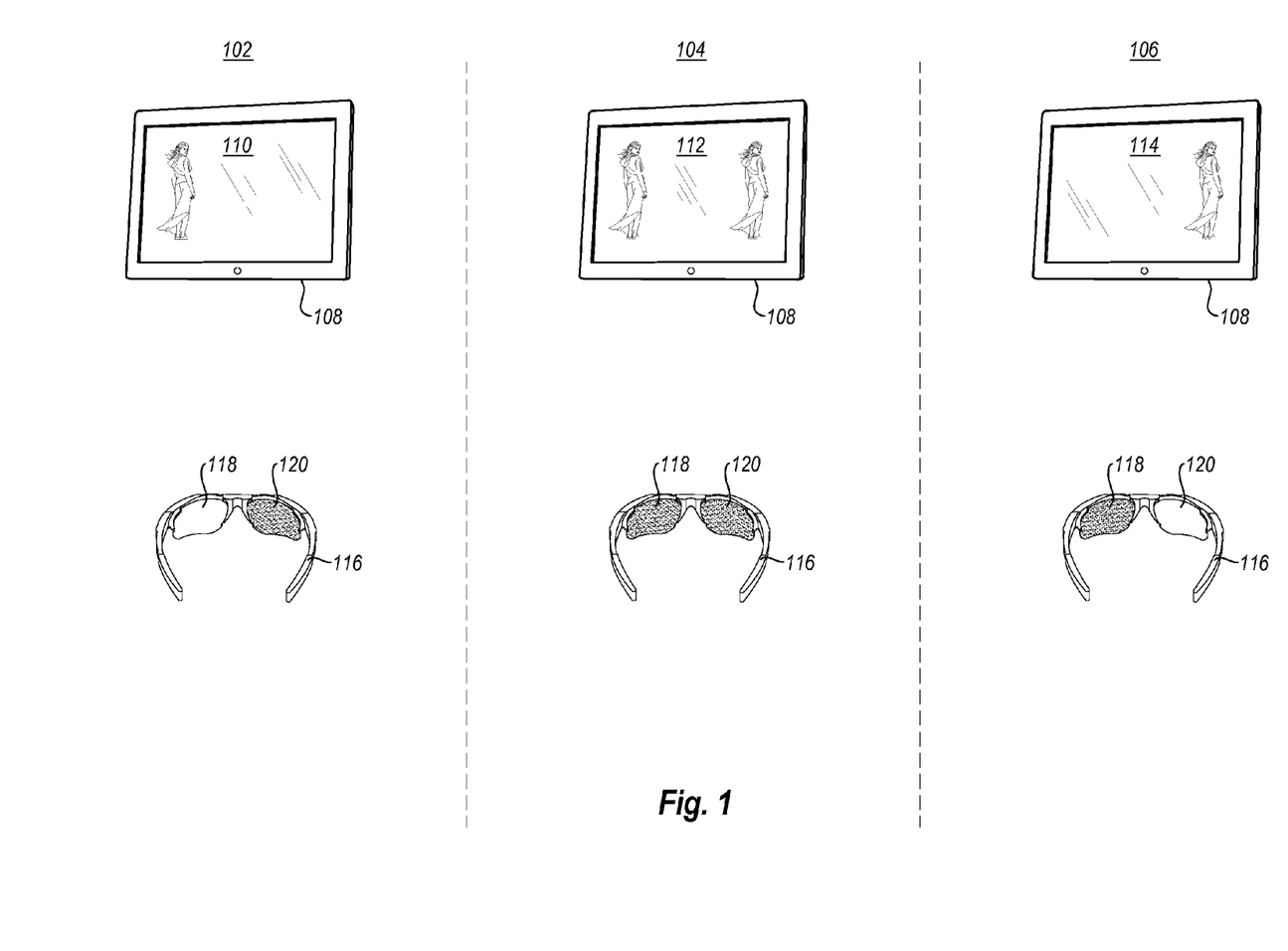
FIG. 1 illustrates a schematic diagram of a method of shuttering three-dimensional video content in accordance with one or more implementations of the present invention.

For example, FIG. 1 illustrates a schematic diagram for shuttering 3D video content in accordance one or more implementations of the present invention. In particular, FIG. 1 illustrates a display device 108 and a shuttering device 116 for use in displaying 3D video content. The display device 108 can be any appropriate display device using number of a variety of current and future display technologies (e.g., Cathode Ray, Plasma, LCD, LED, OLED). Furthermore, the display device 108 can take any of a number of forms, such as a television set, a computer display (e.g., desktop computer monitor, laptop computer display, tablet computer display, and the like), a handheld display (e.g., cellular telephone, PDA, handheld gaming device, handheld multimedia device, among others), or any other appropriate form. In some instances, the display device 108 can even take the form of a projecting device that projects images onto a reflective surface. One will appreciate in light of the disclosure herein that display device 108 can include both digital and analog display devices.

The shuttering device 116 can, in one or more implementations, comprise stereoscopic shuttering glasses that include a plurality of shuttering components 118, 120. The shuttering components 118, 120 can comprise one or more liquid crystal layers. In one or more implementations, the shuttering components correspond to lenses or portions of lenses on the shuttering glasses 116. The liquid crystal layers can have the property of becoming opaque (or substantially opaque) when voltage is applied (or, alternatively, when voltage is removed). Otherwise, the liquid crystal layers can have the property of being transparent (or substantially transparent) when voltage is removed (or, alternatively, when voltage is applied). As discussed more fully herein after, a blanking signal can control the shuttering glasses 116.

FIG. 1 illustrates that displaying 3D content can include at least three different display states 102, 104, and 106. In state 102, for example, a display device 108 can display a first video frame 110. In the illustrated case, the first video frame 110 can correspond to 3D video content intended for view by a viewer's left eye. Thus, in this instance, a shuttering device 116 can use a shuttering component 120 to blank the portion of the viewer's view of the display device 108 corresponding to the viewer's right eye.

Similarly, in state 106, the display device 108 can display a second video frame 114. As illustrated, the second video frame 114 can correspond to 3D video content intended for view by the viewer's right eye. Thus, in this instance, the shuttering device 116 can use a shuttering component 118 to blank the portion of the viewer's view of the display device 108 corresponding to the viewer's left eye.

One will appreciate that states 102 and 106 are not limited to displaying left and right frames in the manner illustrated. For instance, in state 102, the display device 108 can display right eye content, and the shuttering device 116 can use the shuttering component 118 to blank the viewer's left eye. Furthermore, in state 106, the display device 108 can display left eye content, and the shuttering device 116 can use the shuttering component 120 blank the viewer's right eye.

State 104 illustrates a portion of a frame overlap interval in which the display device 108 is transitioning between displaying two video frames. For instance, the display device 108 might be transitioning from display of the video frame 110 to the video frame 114 or from the video frame 114 to the video frame 110. Thus, in one or more implementations, the display device 108 displays an inter-frame overlap 112, in which the display device 108 concurrently displays at least a portion of at least two different video frames (e.g., video frame 110 and video frame 114). In this instance, the shuttering device 116 can concurrently use both shuttering components 118 and 120 to blank portions of the viewer's view of the display device 108 corresponding to both eyes. By blanking both eyes, the shuttering device 116 can prevent the user from viewing all or part of the inter-frame overlap 112 during all or part of the frame overlap interval.

One will appreciate that the appropriate shuttering of a single eye, as in states 102 and 106, when combined with the synchronous display of appropriate 3D video content, can provide the illusion that two-dimensional images are actually three-dimensional. Furthermore, inter-frame blanking, or the synchronous shuttering of both eyes during frame overlap intervals, can enhance the clarity of the perceived 3D image by eliminating undesirable effects such as motion blurring and ghosting. Thus, the disclosed inter-frame blanking techniques can allow for viewing of 3D content on display devices that may have lower frame rates and/or longer frame overlap intervals.

Figure 2:
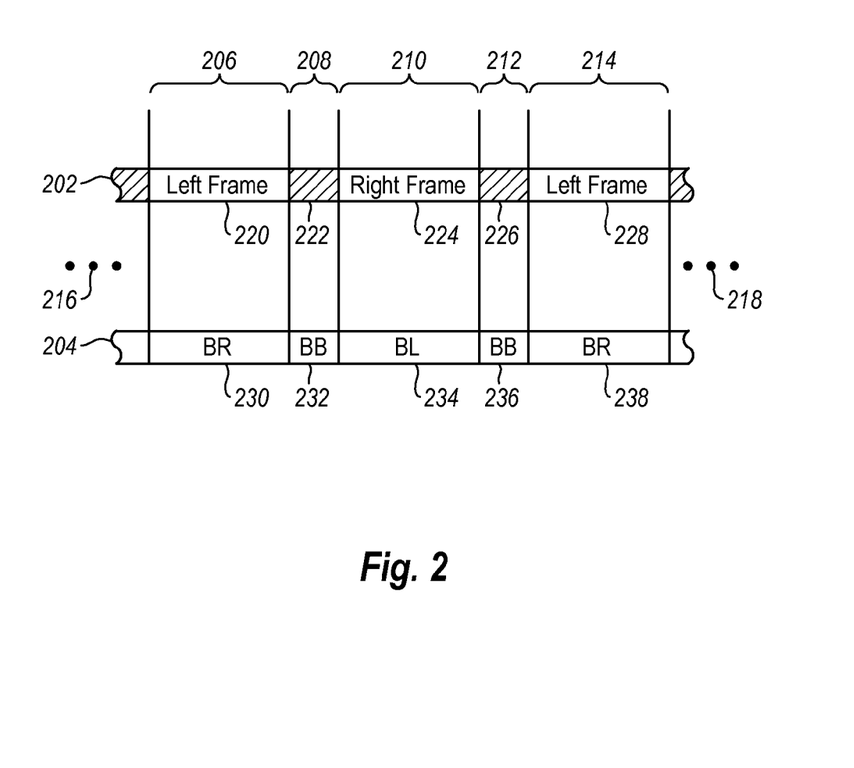
FIG. 2 illustrates a timing diagram demonstrating inter-frame overlap and corresponding blanking instructions in accordance with one or more implementations of the present invention.

FIG. 2 shows a timing diagram demonstrating inter-frame overlap and corresponding blanking instructions in accordance with at least one implementation of the invention. FIG. 2 represents a snapshot of time during the display of video content at a display device. In particular, FIG. 2 includes a plurality of time intervals (e.g., time intervals 206, 208, 210, 212, 214). The horizontal ellipses 216 and 218 indicate that any number of additional time intervals can extend to any point before or after the illustrated snapshot.

Included in FIG. 2 are representations of displayed video content 202 and a corresponding inter-frame blanking signal 204. The displayed video content 202 comprises a series of displayed video frames (e.g., video frames 220, 224, 228). Furthermore, the displayed video content 202 also comprises a plurality of inter-frame overlaps 222, 226. The inter-frame overlaps 222, 226 can comprise the display of portions of at least two different video frames (e.g., inter-frame overlap 222 can comprise the display of at least a portion of video frame 220 and at least a portion of video frame 224).

FIG. 2 illustrates that a display device displays a left video frame 220 corresponding to left eye content during time interval 206. The display device also displays a right video frame 224 corresponding to right eye content during time interval 210. Between these time intervals (i.e., during time interval 208) the display device is in a frame overlap interval and displays an inter-frame overlap 222. Time intervals 212 and 214 further illustrate that, subsequent to displaying the right video frame 224, the display device can transition through another inter-frame overlap 226 to display another left video frame 228.

One will appreciate that while the displayed video content 202 comprises a series of alternating left and right video frames (in any order), one or more implementations extend to any sequence of video frames. In one implementation, for example, the displayed video content 202 comprises differing sequences of left and right video frames (e.g., left, left, right, right). In another implementation, the displayed video content 202 comprises only video frames intended for viewing with both eyes. In yet another implementation, the displayed video content 202 comprises a combination of different video frame types. One combination, for instance, can include both video frames intended for viewing with both eyes, as well as video frames intended for viewing with a single eye.

FIG. 2 also illustrates one implementation of an inter-frame blanking signal 204 that corresponds with the displayed video content 202. In at least one implementation, the inter-frame blanking signal 204 includes one or more instructions that are processed by a blanking device (e.g., shuttering glasses 116 of FIG. 1) synchronously with the displayed video content 202. In some instances, the inter-frame blanking signal 204 can instruct the blanking device to blank an entire time interval. One will appreciate, however, that the inter-frame blanking signal 204 can also instruct the blanking device to blank only a portion of a corresponding time interval. Furthermore, the blanking signal 204 can also instruct the blanking device to blank more than a corresponding time interval.

In the illustrated embodiment, the inter-frame blanking signal 204 can include a blanking instruction 230 (blank right) which instructs the blanking device to blank the right eye view of the displayed video content 202. This instruction may correspond with the displayed left video frame 220. Additionally, the inter-frame blanking signal 204 can include a blanking instruction 224 (blank left) which instructs the blanking device to blank the right eye view of the displayed video content 202. This instruction may correspond with the displayed right video frame 224.

Furthermore, the inter-frame blanking signal 204 can include a blanking instruction 232 (blank both) which instructs the blanking device to blank both the right and left eye views of the displayed video content 202. This instruction may correspond with the displayed inter-frame overlap 222 during time interval 208 (a frame overlap interval). Of course, the inter-frame blanking signal 204 can also include other blanking instructions, such as blanking instructions 236 and 238 corresponding to time intervals 212 and 214. Also, as indicated herein above, blanking instructions 230-238 can blank all the time in their corresponding time intervals, a portion of the time in their corresponding time intervals, or more time than is in their corresponding time intervals.

One will appreciate in light of the disclosure herein that the inter-frame blanking signal 204 can include any appropriate sequence of blanking instructions that correspond to the displayed video content 202. For instance, if displayed video content 202 includes a different sequence of left and right video frames, the inter-frame blanking signal 204 can include an appropriate different sequence of blanking instructions. Furthermore, the inter-frame blanking signal 204 can depart from the illustrated implementations. For example, inter-frame blanking signal 204 can refrain from blanking during one or more time intervals corresponding to a transition. Furthermore, inter-frame blanking signal 204 can include any number of other blanking instructions, such as blanking instructions that do no blanking (e.g., when displaying a video frame intended for viewing with both eyes).

In at least one implementation, generation of the inter-frame blanking signal 204 occurs prior to the display of video content. In such an implementation, a processing device processes a 3D video signal to determine inter-frame overlap information. The processing device then generates the inter-frame blanking signal 204 based on the determined inter-frame overlap information. The processing device can then send the inter-frame blanking signal 204 to a blanking device. The blanking device can receive the inter-frame blanking signal 204 prior to, or concurrently with, the display of the displayed video content 202.

Illustratively, processing the 3D video signal can include processing the 3D video signal in view of physical characteristics or parameters of an intended display device. For instance, processing the 3D video signal can include determining a frame size of video frames of a particular 3D video signal (e.g., 720 interlaced or progressive vertical lines, 1080 interlaced or progressive vertical lines, etc.). Furthermore, processing the 3D video signal can include determining the frame rate and response time of the intended display device. In addition, processing the 3D video signal can include using this information to calculate the inter-frame overlap interval, and the timing of the displayed video content on the intended display device.

A display device may have a frame rate of 60 Hz, meaning that it displays sixty video frames per second. This display device may also have a frame overlap interval of 25 milliseconds (ms), meaning that inter-frame overlap occurs for 25 ms when transitioning between two video frames (e.g., left video frame 220 and right video frame 210). Further, the frame size may be 720p, meaning that each video frame includes 720 lines of vertical data. Of course, these parameters are merely illustrative and are not limiting.

Based on the foregoing information, the processing device can generate a proper sequence and timing of blanking instructions for the particular 3D video signal and the exemplary display device. These instructions can include a blanking instruction (e.g., blank left or blank right) for blanking the appropriate eye while the display device will display a left or right video frame individually. After the display device will have drawn the $720^{th}$ line of the individual video frame, the instructions can also include a blanking instruction (e.g., blank both) for blanking both eyes during the transition to the next video frame. In this instance, the blanking instruction may instruct the blanking device to blank both eyes for a period of 25 ms. Then, the blanking instructions can instruct the blanking device to blank the other eye while the display device will display another individual video frame.

Figure 3:
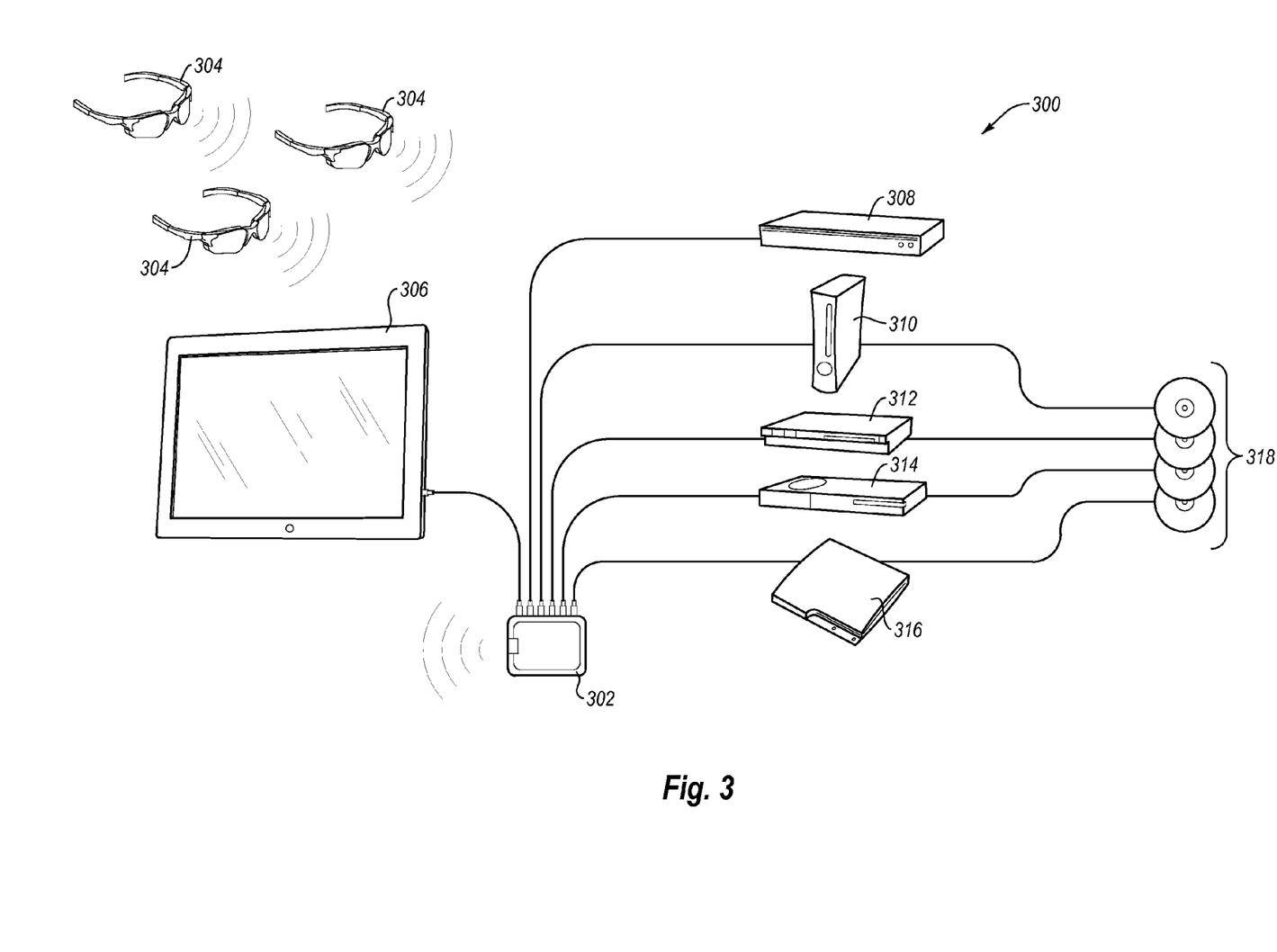
FIG. 3 illustrates a schematic diagram of a system for use in a method of blanking inter-frame overlap in accordance with one or more implementations of the present invention.

Turning now to FIG. 3, a schematic diagram of a system 300 for use in a method of blanking inter-frame overlap in accordance with one or more implementations is illustrated. FIG. 3 illustrates that the system 300 can include a video processing device 302, one or more blanking devices 304, and a display device 306. In one or more implementations, these devices are separate devices. In other implementations, however, some devices are combined. For instance, the video processing device 302 and the display device 306 may be combined into one more units.

In at least one implementation, the video processing device 302 receives a 3D video signal from a media device. The media device can comprise any number of devices capable of transmitting a 3D video signal. For example, FIG. 3 illustrates that the media device can comprise a steaming source 308 (e.g., a satellite box, cable box, internet), a gaming device (e.g., XBOX 310, PLAYSTATION 316), a player device (e.g., BLU-RAY player 312, DVD player 314). In one or more implementations, the media device can receive 3D video content from a DVD or Blu-Ray disc 318. In alternative implementations, the media device can receive the 3D video content via the Internet, a cable provider, or a satellite dish.

In any event, the video processing device 302 can also generate an inter-frame blanking signal (e.g., inter-frame blanking signal 204). The video processing device 302 can send the 3D video signal, either in its original form or in a modified form, to the display device 306 for display to one or more users (e.g., as displayed video content 202). Prior to or concurrently with sending the 3D video signal, the video processing device 302 can also send the generated inter-frame blanking signal to the blanking device(s) 304.

The video processing device 302 can communicate with the display device 306 and the blanking device(s) 304 in any appropriate manner. For instance, an appropriate wired mechanism, such as High Definition Media Interface (HDMI), component, composite, coaxial, network, optical, and the like can couple the video processing device 302 and the display device together. Additionally, or alternatively, an appropriate wireless mechanism, such as BLUETOOTH, Wi-Fi, etc., can couple he video processing device 302 and the display device 306 together. Likewise, any appropriate wired or wireless mechanism (e.g., BLUETOOTH, infrared, etc.) can couple the video processing device 302 and the blanking device(s) 304 together.

The display device 306 can be one of a broad range of display devices, including display devices that have relatively low frame rates and/or relatively long frame overlap intervals. The display device 306 can also be a display device exhibiting relatively high frame rates and/or relatively short frame overlaps. Of course, the display device 306 can exhibit many combinations of frame rates and frame overlap intervals. The display device 306 can even be a specialized 3D display device.

The one or more blanking devices 304 can be any blanking device configured to interoperate with video processing device 302, and respond to instructions received via an inter-frame blanking signal. Blanking device(s) 304 can be a single device or a plurality of devices (e.g., when there is a plurality of users). In at least one implementation, the blanking device(s) 304 comprises shuttering glasses that include one or more shuttering components that selectively block a user's view of the display device 306. Generally, the blanking device(s) 304 is capable of selectively blanking a left eye view, a right eye view, and a view from both eyes. Of course, the blanking device(s) 304 can also refrain from blanking any part of the user's view.

The video processing device 302 can communicate the inter-frame blanking signal to the blanking device(s) 304 in any number of formats, including both analog and digital signals. For instance, when communicating using analog signals, blanking instructions can comprise various frequencies and/or amplitudes of light, electromagnetic waves, sound, etc. Alternatively, when communicating using digital signals, blanking instructions can comprise data packets. Of course, the video processing device 302 and the blanking device(s) 304 can communicate using any combination of analog and digital signals. In one or more implementations, the communication is uni-directional (i.e., from the video processing device 302 to the blanking device(s) 304), while in other embodiments the communication is bi-directional.

Figure 4:
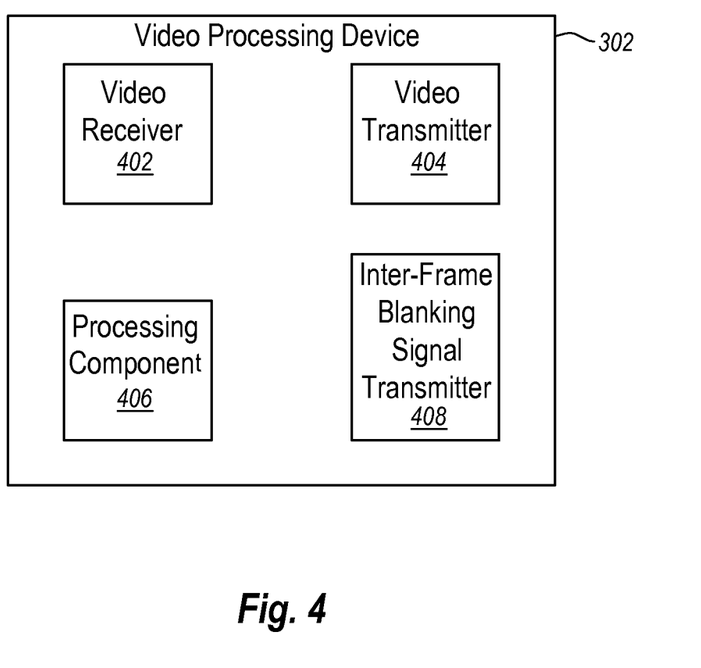
FIG. 4 illustrates a schematic diagram of a video processing device for use in accordance with one or more implementations of the present invention.

FIG. 4 illustrates a schematic diagram of video processing device 302. As illustrated, video processing device 302 can include a plurality of components, including a video receiver component 402, a video transmitter component 404, a processing component 406, and an inter-frame blanking signal transmitter component 408. Of course, the video processing device 302 can include any number of additional components. The video processing device 302 can also include fewer components than those illustrated.

The video receiver component 402 can receive a 3D video signal from any appropriate source, such as a media device. The video transmitter component 404 can send the 3D video signal to the display device 306, either in its original form or in a modified form. One will appreciate that these components can be combined as a single component, or can even be eliminated altogether (e.g., when the video processing device 302 is integrated with the display device 306). The video receiver component 402 can receive a plurality of 3D video signal formats, and the video transmitter component 404 can transmit a plurality of 3D video signal formats, including a universal 3D video signal format.

The processing component 406 can process the received 3D video signal in any appropriate manner, regardless of the original received 3D video signal format. In particular, the processing component 406 can determine frame overlap interval information of the received 3D video signal and generate an inter-frame blanking signal for a particular display device. The processing component 406 can also convert or modify the received 3D video signal. In some circumstances, for example, the processing component 406 can convert the received 3D video signal into universal 3D video signal format. One will appreciate that processing component 406 can include any number constituent components.

In one or more implementations, the processing component 406 can convert the received 3D video signal into a universal 3D video signal format by decoding the received 3D video signal into two frame buffers. This can include decoding right eye image data into one frame buffer and decoding left eye image data into the other frame buffer. By decoding image data into two frame buffers, the image data is readily available for encoding into the universal 3D video signal format. One will appreciate that the 3D video signal can encode the image data using various techniques, and that decoding can include constructing full image data in from a plurality of video frames.

Inter-frame blanking signal transmitter 408 can transmit the generated inter-frame blanking signal to one or more blanking devices (e.g., blanking device(s) 304). As discussed herein above, the blanking signal transmitter 408 can transmit wirelessly (e.g., Bluetooth or infrared) or with a wired connection. Also discussed herein above, the blanking signal transmitter 408 can employ any number of protocols, analog or digital. In some circumstances, the blanking signal transmitter 408 is incorporated with the video processing device 302 or even with the display device 306, while in other instances the blanking signal transmitter 408 is a separate device (e.g., a separate USB device).

One will appreciate that the video processing device 302 can take any of a variety of forms. As indicated, the video processing device 302 can, in one or more implementations, be integrated with the display device 306. In other implementations, the video processing device 302 can be a set-top box or other customized computing system. In yet other implementations, the video processing device 302 can be a general-purpose computing system (e.g., a laptop computer, a desktop computer, a tablet computer, etc.), or a special purpose computing system (e.g., a gaming console, a set-top box, etc.) that has been adapted to implement one or more disclosed features.

Accordingly, FIGS. 1-4, and the corresponding text, illustrate or describe a number of schematics, diagrams, devices and components that can be used to enhance the viewing of 3D content. Specifically, one will appreciate that these schematics, diagrams, devices and components can be used to perform inter-frame blanking of displayed 3D content.

Figure 5:
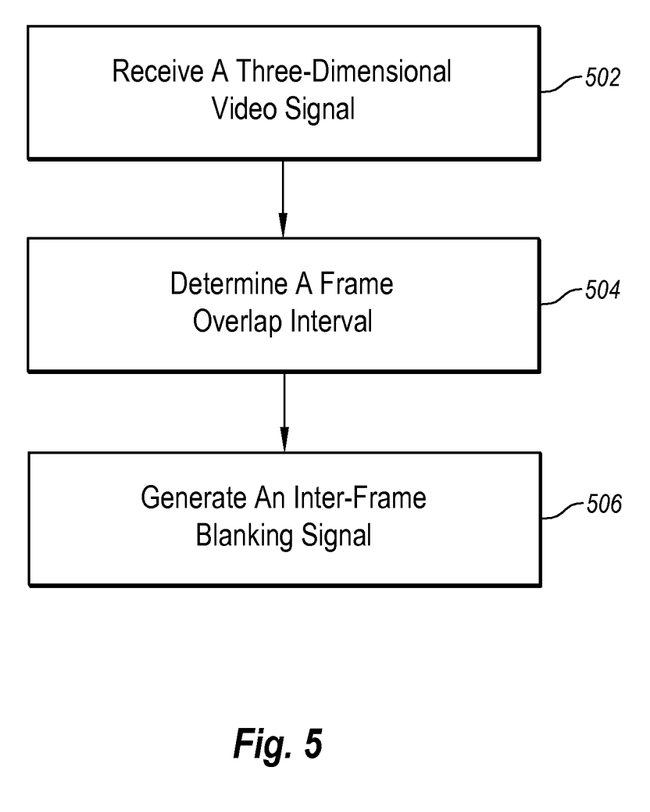
FIG. 5 illustrates a flowchart of a series of acts in a method in accordance with an implementation of the present invention of blanking of inter-frame overlap of a three-dimensional video signal.
Figure 6:
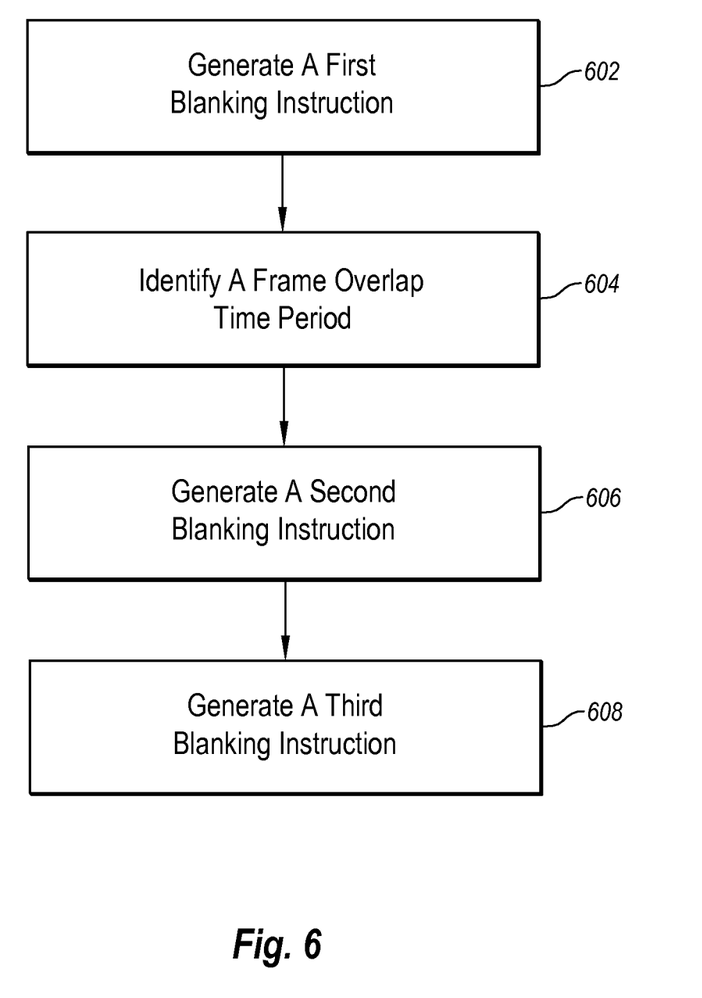
FIG. 6 illustrates a flowchart of a series of acts in a method in accordance with an implementation of the present invention of generating an inter-frame blanking signal which includes instructions for a blanking device on filtering the display of a three-dimensional video signal.

Additionally, implementations of the present invention can also be described in terms of flowcharts comprising one or more acts in a method for accomplishing a particular result. Along these lines, FIGS. 5-6 illustrate flowcharts of computerized methods of inter-frame blanking through generated inter-frame blanking signals. For example, FIG. 5 illustrates a flowchart of a method of blanking an inter-frame overlap of a three-dimensional video signal. Similarly, FIG. 6 illustrates a flowchart of a method of generating an inter-frame blanking signal that includes instructions for a blanking device on filtering the display of a three-dimensional video signal. The acts of FIGS. 5 and 6 are described herein below with respect to the schematics, diagrams, devices and components shown in FIGS. 1-4.

For example, FIG. 5 shows that a method of blanking an inter-frame overlap of a three-dimensional video signal can comprise an act 502 of receiving a 3D video signal. Act 502 can include receiving a three-dimensional video signal comprising at least a first video frame and a second video frame. For example, a video processing device 302 can receive a 3D video signal. In at least one implementation, a video receiver component 402 of the video processing device 302 can receive a 3D video signal from a media device 308, 310, 312, 314, 316. As discussed herein above, video receiver component 402 can receive a 3D video signal in any of a plurality of 3D video formats. The received 3D video signal can include any combination and any sequence of video frames intended to be viewed by a user's left eye, the user's right eye, or both of the user's eyes.

FIG. 5 also shows that the method can comprise an act 504 of determining a frame overlap interval. Act 504 can include determining a frame overlap interval in which at least a portion of the first video frame and at least a portion of the second video frame are to be displayed concurrently at a display device during a transition between the first video frame and the second video frame. For example, a processing component 406 of the video processing device 302 can process information about the received 3D video signal (e.g., frame size) as well as information about a display device 306 (e.g., frame rate, response time). Based on one or more of the frame size, frame rate, and response time, the processing component 406 can determine the frame overlap interval and other timing information.

In addition, FIG. 5 shows that the method can comprise an act 506 of generating an inter-frame blanking signal. Act 506 can include generating an inter-frame blanking signal based on the determined frame overlap interval. The inter-frame blanking signal comprising one or more instructions for instructing a blanking device to blank a display of the three-dimensional video signal during the transition. For example, a processing component 406 of the video processing device 302 can generate a series of blanking instructions (e.g., blanking instructions 230-238). These instructions can instruct a blanking device (e.g., blanking device(s) 304) how to filter or blank the user's view of the received 3D video signal as it is displayed at display device 306. For instance, the blanking signal can include blanking instructions (e.g., blanking instructions 232 and 236) that blank the view of both of the user's eyes during at least a portion of a frame overlap interval.

In addition to the foregoing, FIG. 6 illustrates that a method of generating an inter-frame blanking signal. The inter-frame blanking signal can include instructions for a blanking device on filtering the display of a 3D video signal. The method can comprise an act 602 of generating a first blanking instruction. Act 602 can include generating a first blanking instruction that directs a blanking device to blank a first portion of a view of a display device during at least a portion of a display of a first video frame.

For example, the video processing device 302 can generate an inter-frame blanking signal 204 that includes a blanking instruction 230 which instructs the blanking device(s) 304 to blank the user's right eye view during display a left video frame 220. Alternatively, the video processing device 302 can generate an inter-frame blanking signal 204 including other blanking instructions. For instance, the video processing device 302 can generate a blanking instruction which instructs the blanking device(s) 304 to blank the user's left eye view during display a right video frame. Furthermore, the video processing device 302 can generate can generate an inter-frame blanking signal 204 that also includes a blanking instruction that instructs the blanking device(s) 304 to refrain from blanking any eye view during display a video frame intended for view by both eyes.

FIG. 6 also shows that the method can comprise an act 604 of identifying a frame overlap time period. Act 604 can include identifying a frame overlap time period in which at least a portion of the first video frame and at least a portion of a second video frame are to be displayed concurrently at the display device. For example, the video processing device 302 can indentify a time interval 208 corresponding to a frame overlap interval. Accordingly, the video processing device 302 can identify time intervals 208 as a frame overlap time period.

In addition, FIG. 6 shows that the method can comprise an act 606 of generating a second blanking instruction. Act 606 can include generating a second blanking instruction corresponding to the frame overlap time period that directs the blanking device to simultaneously blank the first portion and a second portion of the view of the display device during at least a portion of the frame overlap time period. For example, the video processing device 302 can generate an inter-frame blanking signal 204 that includes a blanking instruction 232, which instructs the blanking device(s) 304 to blank both of the user's eyes during time interval 208. For instance, time interval 208 may begin immediately after drawing the last line of left video frame 220 and extend during at least a portion of frame overlap interval until right frame 224 is uniquely displayed.

Furthermore, FIG. 6 shows that the method can comprise an act 608 of generating a third blanking instruction. Act 608 can include generating a third blanking instruction that directs the blanking device to blank the second portion of the view of the display device during at least a portion of a display of the second video frame. For example, the video processing device 302 can generate an inter-frame blanking signal 204 that includes a blanking instruction 234, which instructs the blanking device(s) 304 to blank the user's left eye view during display a right video frame 224.

Alternatively, the video processing device 302 can generate an inter-frame blanking signal 204 including other blanking instructions. For instance, the video processing device 302 can generate an inter-frame blanking signal 204 that instructs the blanking device(s) 304 to blank the user's right eye view during display a left video frame. Furthermore, inter-frame blanking signal 204 could include a blanking instruction which instructs the blanking device(s) 304 to refrain from blanking any eye view during display a video frame intended for view by both eyes.

Accordingly, FIGS. 1-6 provide a number of components and mechanisms for the inter-frame blanking of some or all of the frame overlap interval that occurs when displaying 3D content. Thus, one or more disclosed implementations allow for viewing of 3D content on a broad range of display devices, including devices that that may have lower frame rates and longer frame overlap intervals, or that are not otherwise specifically designed for displaying 3D content.

The implementations of the present invention can comprise a special purpose or general-purpose computing systems. Computing systems may, for example, be handheld devices, appliances, laptop computers, desktop computers, mainframes, distributed computing systems, or even devices that have not conventionally considered a computing system, such as DVD players, Blu-Ray Players, gaming systems, and video converters. In this description and in the claims, the term "computing system" is defined broadly as including any device or system (or combination thereof) that includes at least one physical and tangible processor, and a physical and tangible memory capable of having thereon computer-executable instructions that may be executed by the processor.

The memory may take any form and may depend on the nature and form of the computing system. A computing system may be distributed over a network environment and may include multiple constituent computing systems. In its most basic configuration, a computing system typically includes at least one processing unit and memory. The memory may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

Implementations of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At a computer system, the computer system including one or more processors and a memory, a method of blanking an inter-frame overlap of a three-dimensional video signal, the method comprising the acts of:
   receiving a three-dimensional video signal comprising at least a first video frame and a second video frame;
   determining a frame size of one or more of the first video frame and the second video frame;
   identifying physical characteristics of a display device at which the first video frame and the second video frame are to be displayed, including a frame rate and refresh rate of the display device;
   determining, using the one or more processors, a frame overlap interval in which at least a portion of the first video frame and at least a portion of the second video frame are to be displayed concurrently at the display device during a transition between the first video frame and the second video frame, wherein determining the frame overlap interval comprises processing the frame rate and refresh rate; and
   generating an inter-frame blanking signal based on the determined frame overlap interval, the inter-frame blanking signal comprising one or more instructions for instructing a blanking device to concurrently blank a display of the three-dimensional video signal during the transition, wherein generating the inter-frame blanking signal comprises processing the frame size and the frame overlap interval.

2. The method of claim 1, further comprising transmitting the inter-frame blanking signal to the blanking device.

3. The method of claim 1, wherein the frame overlap interval begins after drawing the last line of the first video frame.

4. The method of claim 1, wherein blanking the display of the three-dimensional video signal comprises concurrently blanking both of a viewer's eyes during at least a portion of the frame overlap interval.

5. The method of claim 1, wherein:
   the first video frame comprises an image intended for display to a viewer's right eye;
   the second video frame comprises an image intended for display to a viewer's left eye; and
   the inter-frame blanking signal comprises:
      at least one blanking instruction for blanking a viewer's left eye during a display of the first video frame,
      at least one blanking instruction for blanking both of the viewer's eyes during the transition, and
      at least one blanking instruction for blanking a viewer's right eye during a display of the second video frame.

6. The method of claim 1, wherein the blanking device comprises shuttering glasses.

7. The method of claim 6, wherein the blanking device comprises an electrochromatic layer.

8. The method of claim 1, further comprising:
   generating a second inter-frame blanking signal that directs the blanking device to blank a first portion of a view of the display device during at least a portion of a display of the first video frame.

9. The method of claim 1, further comprising:
   generating a third inter-frame blanking signal that directs the blanking device to blank a second portion of a view of the display device during at least a portion of a display of the second video frame.

10. The method of claim 1, further comprising:
    generating a non-blanking signal that directs the blanking device to refrain from blanking a view of the display device during at least a portion of a display of a video frame.

11. The method of claim 1, further comprising:
    generating a first inter-frame blanking signal that comprises at least one blanking instruction for blanking a viewer's first eye during a display of a third video frame; and
    generating a second inter-frame blanking signal that comprises at least one blanking instruction for blanking a viewer's second eye during a display of a fourth video frame.

12. The method of claim 11, further comprising:
    generating consecutively at least two inter-frame blanking signals that each
    comprise at least one blanking instruction for blanking a viewer's first eye.

13. The method of claim 1, further comprising:
    communicating an analog blanking instruction to the blanking device.

14. The method of claim 1, further comprising:
    communicating a digital blanking instruction to the blanking device.

15. At a computer system, the computer system including one or more processors and a memory, a method of generating an inter-frame blanking signal that includes instructions for a blanking device on blanking an inter-frame overlap of a three-dimensional video signal, the method comprising the acts of:

generating a first blanking instruction that directs a blanking device to blank a first portion of a view of a display device during at least a portion of a display of a first video frame;

identifying a frame overlap time period in which at least a portion of the first video frame and at least a portion of a second video frame are to be displayed concurrently at the display device, wherein identifying a frame overlap time period comprises processing the frame rate and refresh rate;

generating, using the one or more processors, a second blanking instruction corresponding to the frame overlap time period that directs the blanking device to simultaneously blank the first portion and a second portion of the view of the display device during at least a portion of the frame overlap time period while the at least the portion of the first video frame and the at least the portion of the second video frame are being displayed concurrently at the display device, wherein generating the second blanking instruction comprises processing the frame size and the frame overlap interval; and generating a third blanking instruction that directs the blanking device to blank the second portion of the view of the display device during at least a portion of a display of the second video frame.

16. The method of claim 15, wherein:
the first video frame is a video frame for display to a right eye;
the second video frame is a video frame for display to a left eye;
the first blanking instruction directs the blanking device to blank a left eye view of the display device; and
the third blanking instruction directs the blanking device to blank a right eye view of the display device.

17. The method of claim 15, wherein:
the first video frame is a video frame for display to a left eye;
the second video frame is a video frame for display to a right eye;
the first blanking instruction directs the blanking device to blank a right eye view of the display device; and
the third blanking instruction directs the blanking device to blank a left eye view of the display device.

18. The method of claim 15, wherein identifying the frame overlap time period comprises analyzing physical characteristics of the display device.

19. The method of claim 15, wherein simultaneously blanking the first portion and the second portion of the view of the display device during at least a portion of the frame overlap time period comprises simultaneously blocking at least a portion of the view seen by each of a viewer's eyes.

20. The method of claim 15, wherein the frame overlap time period begins immediately after drawing a last line of the first video frame.

21. The method of claim 15, wherein the second blanking instruction includes directions to simultaneously blank the first portion and the second portion of the view of the display device during the entire frame overlap time period.

22. The method of claim 15, wherein the second blanking instruction includes directions to simultaneously blank the first portion and the second portion of the view of the display device for a time period longer than the frame overlap time period.

23. The method of claim 15, further comprises generating a fourth blanking instruction which directs the blanking device to refrain from blanking any portion of the view of the display device.

24. The method of claim 15, wherein the blanking device comprises stereoscopic shuttering glasses.

25. The method of claim 24, wherein the blanking device comprises an electrochromatic layer.

26. The method of claim 15, further comprising:
communicating an analog blanking instruction to the blanking device.

27. The method of claim 15, further comprising:
communicating a digital blanking instruction to the blanking device.

28. At a computer system, the computer system including one or more processors and a memory, a method of blanking an inter-frame overlap of a three-dimensional video signal, the method comprising the acts of:

receiving a three-dimensional video signal comprising at least a first video frame and a second video frame;

determining, using the one or more processors, a frame overlap interval in which at least a portion of the first video frame and at least a portion of the second video frame are to be displayed concurrently at a display device during a transition between the first video frame and the second video frame, wherein determining the frame overlap interval comprises processing the frame rate and refresh rate; and generating an inter-frame blanking signal based on the determined frame overlap interval, the inter-frame blanking signal comprising one or more instructions for instructing a blanking device to concurrently blank both of a viewer's eyes while the at least a portion of the first video frame and the at least a portion of the second video frame are being displayed concurrently at a display device during the transition, wherein generating the inter-frame blanking signal comprises processing the frame size and the frame overlap interval.

29. The method of claim 28, further comprising determining a frame size of one or more of the first video frame and the second video frame.

30. The method of claim 29, further comprising identifying physical characteristics of the display device, including a frame rate and refresh rate of the display device.

31. The method of claim 28, wherein:
the first video frame comprises an image intended for display to a viewer's left eye;
the second video frame comprises an image intended for display to a viewer's right eye; and
the inter-frame blanking signal comprises:
at least one blanking instruction for blanking a viewer's right eye during a display of the first video frame,
at least one blanking instruction for blanking both of the viewer's eyes during the transition, and
at least one blanking instruction for blanking a viewer's left eye during a display of the second video frame.

32. The method of claim 28, further comprising transmitting the inter-frame blanking signal to the blanking device.

33. The method of claim 18, wherein the frame overlap interval begins after drawing the last line of the first video frame.

34. The method of claim 18, wherein blanking the display of the three-dimensional video signal comprises concurrently blanking both of a viewer's eyes during at least a portion of the frame overlap interval.

35. The method of claim 18, wherein:
the first video frame comprises an image intended for display to a viewer's right eye;
the second video frame comprises an image intended for display to a viewer's left eye; and
the inter-frame blanking signal comprises:

at least one blanking instruction for blanking a viewer's left eye during a display of the first video frame,
at least one blanking instruction for blanking both of the viewer's eyes during the transition, and
at least one blanking instruction for blanking a viewer's right eye during a display of the second video frame.

36. The method of claim 18, wherein the blanking device comprises shuttering glasses.

37. The method of claim 36, wherein the blanking device comprises an electrochromatic layer.

38. The method of claim 28, further comprising:
generating a second inter-frame blanking signal that directs the blanking device to blank a first portion of a view of the display device during at least a portion of a display of the first video frame.

39. The method of claim 38, further comprising:
generating a third inter-frame blanking signal that directs the blanking device to blank a second portion of a view of the display device during at least a portion of a display of the second video frame.

40. The method of claim 28, further comprising:
generating a non-blanking signal that directs the blanking device to refrain from blanking a view of the display device during at least a portion of a display of a video frame.

* * * * *

UNITED STATES PATENT AND TRADEMARK OFFICE
CERTIFICATE OF CORRECTION

PATENT NO. : 8,553,072 B2  
APPLICATION NO. : 13/377132  
DATED : October 8, 2013  
INVENTOR(S) : Tabor Page 1 of 2

It is certified that error appears in the above-identified patent and that said Letters Patent is hereby corrected as shown below:

In the Specifications

Column 1
Line 39, change "devices, generally" to --devices generally--

Column 3
Line 45, change "For example, specialized" to --For example, a specialized--
Line 46, change "modification" to --modification(s)--

Column 4
Line 9, change "using number" to --using any number--

Column 6
Line 18, change "blanking instruction 224" to --blanking instruction 234--

Column 7
Line 13, change "frame 210" to --frame 224--
Line 40, change "one more units" to --one or more units--
Line 45, change "steaming source" to --streaming source--

Column 8
Line 3, change "he video" to --the video--

Column 10
Line 33, change "comprising" to --can comprise--
Line 46, change "illustrates that a method" to --illustrates a method--
Line 64, change "display a right" to --display of a right--

Signed and Sealed this
Sixth Day of May, 2014

Michelle K. Lee
*Deputy Director of the United States Patent and Trademark Office*

CERTIFICATE OF CORRECTION (continued)
U.S. Pat. No. 8,553,072 B2

<u>Column 11</u>
Line 11, change "intervals 208" to --interval 208--
Line 58, change "systems" to --system(s)--

<u>Column 12</u>
Line 52, change "carry or" to --carry out--

In the Claims

<u>Column 14</u>
Lines 54-55, change "that each            comprise" to --that each comprise--

<u>Column 16</u>
Line 55, change "claim 18" to --claim 28--
Line 58, change "claim 18" to --claim 28--
Line 62, change "claim 18" to --claim 28--

<u>Column 17</u>
Line 7, change "claim 18" to --claim 28--